United States Patent
Marchis et al.

(10) Patent No.: US 9,132,483 B2
(45) Date of Patent: Sep. 15, 2015

(54) METHOD FOR MANUFACTURING A VARIATOR DISC FOR USE IN A TOROIDAL CONTINUOUSLY VARIABLE TRANSMISSION

(71) Applicant: Aktiebolaget SKF, Göteborg (SE)

(72) Inventors: Renato Marchis, Turin (IT); Stefano Richaud, Villar Perosa (IT)

(73) Assignee: AKTIEBOLAGET SKF, Gothenburg (SE)

( * ) Notice: Subject to any disclaimer, the term of this patent is extended or adjusted under 35 U.S.C. 154(b) by 234 days.

(21) Appl. No.: 13/942,035

(22) Filed: Jul. 15, 2013

(65) Prior Publication Data
US 2014/0020232 A1    Jan. 23, 2014

(30) Foreign Application Priority Data
Jul. 13, 2012  (IT) .............................. TO2012A0622

(51) Int. Cl.
| | | |
|---|---|---|
| B23P 15/14 | (2006.01) | |
| B23B 5/36 | (2006.01) | |
| B23B 31/12 | (2006.01) | |
| B23B 31/40 | (2006.01) | |
| B23B 5/40 | (2006.01) | |
| B23P 13/02 | (2006.01) | |
| F16H 15/38 | (2006.01) | |

(52) U.S. Cl.
CPC ... B23B 5/36 (2013.01); B23B 5/40 (2013.01); B23B 31/1207 (2013.01); B23B 31/4033 (2013.01); B23P 13/02 (2013.01); B23P 15/14 (2013.01); F16H 15/38 (2013.01); *Y10T 29/49996* (2015.01); *Y10T 29/49998* (2015.01); *Y10T 29/5109* (2015.01)

(58) Field of Classification Search
CPC ......... B23P 13/02; B23P 15/14; B23Q 3/062; B23Q 3/18; B23Q 2703/02; B23Q 2703/10; B25B 5/14; B25B 5/163; B25B 11/00; B23B 5/26; B23B 5/36; B23B 5/40; B23B 31/16; B23B 31/1261; Y10T 29/49467; Y10T 29/49996; Y10T 29/49995; Y10T 29/49998; Y10T 29/5109; F16H 15/38
See application file for complete search history.

(56) References Cited

U.S. PATENT DOCUMENTS

| | | | |
|---|---|---|---|
| 6,637,107 B2 | 10/2003 | Yasuhara et al. | |
| 2002/0013123 A1 | 1/2002 | Kamamura et al. | |
| 2003/0084560 A1 | 5/2003 | Yasuhara et al. | |
| 2005/0070400 A1 | 3/2005 | Hirata et al. | |
| 2005/0215184 A1 | 9/2005 | Hirata | |

FOREIGN PATENT DOCUMENTS

| | | |
|---|---|---|
| EP | 1380769 A2 | 1/2004 |
| JP | 2004286166 A | 10/2004 |
| WO | 2012077354 A1 | 6/2012 |

*Primary Examiner* — Jermie Cozart
(74) *Attorney, Agent, or Firm* — Bryan Peckjian; SKF USA Inc. Patent Dept.

(57) ABSTRACT

A steel disc blank provides a first face with a concave race, a second face opposite to the first face, a central through bore extending between the first and second face, and an outer peripheral edge; the disc blank is heat-treated; then the bore is turned, thus obtaining at least one cylindrical turned portion of the bore, and then the concave race is turned, holding the disc blank locked on the lathe by means of jaws engaging on the machined cylindrical portion, using this turned cylindrical portion as a reference surface for turning of the concave race.

7 Claims, 3 Drawing Sheets

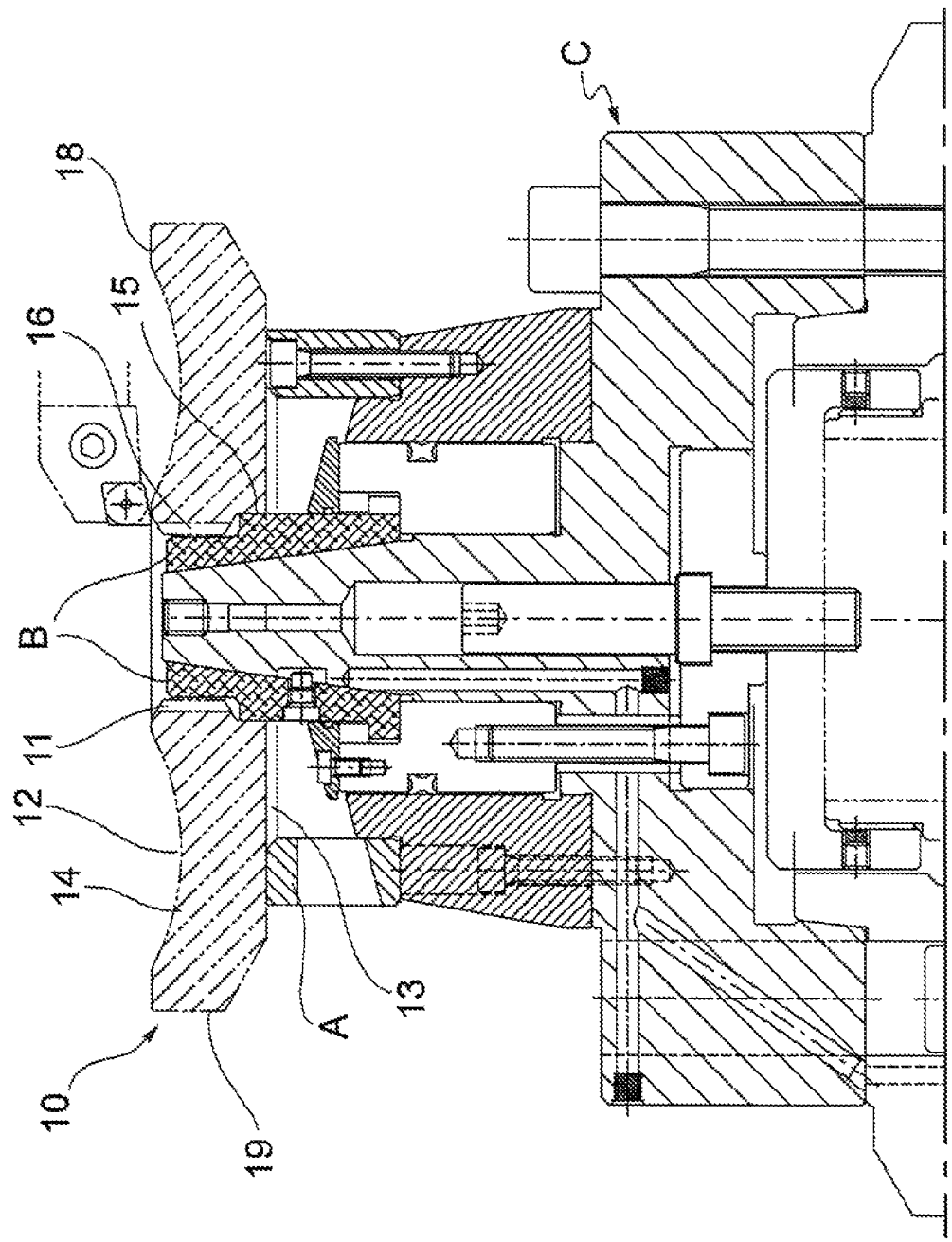

METHOD FOR MANUFACTURING A VARIATOR DISC FOR USE IN A TOROIDAL CONTINUOUSLY VARIABLE TRANSMISSION

CROSS-REFERENCE TO RELATED APPLICATION

This application is a United States Non-Provisional Utility Patent Application claiming the benefit of Italian Patent Application Number TO2012A000622 filed on 13 Jul. 2012, which is incorporated herein in its entirety. Applicants respectfully note, 13 Jul. 2013 falls on a Saturday; therefore, Applicants are afforded through the next business day to maintain copendency.

TECHNICAL FIELD

The present invention relates to a method for manufacturing a variator disc for use in a toroidal continuously variable transmission. More particularly, the invention relates to the manufacturing a variator disc of the type having a concave race on one of its faces and a central bore for mounting the disc on a shaft.

BACKGROUND ART

U.S. Pat. No. 6,637,107 discloses a method of manufacturing a variator disc having a concave race on one of its faces to be engaged by rollers and a splined central bore for engaging a splined shaft. This method comprises the steps of:

forming a concave race with a machining allowance on a face of an annular blank;

forming said splined bore through the blank providing the race;

heat-treating the blank to harden it, and in a condition in which the blank is retained on the shaft which engages the splined bore after heat-treating the blank, performing a finishing step on an outer periphery of said disc by using the shaft as a reference for the finishing. The finishing of the race is then performed using the outer periphery as a reference for machining. A variant of the method provides that, after the heat-treatment, the finishing of the flanks of the grooves is performed by means of a broach, and then the race is finished by using the sides of the grooves as a reference for machining.

DISCLOSURE OF INVENTION

The present invention is directed to manufacturing a toroidal disc which provides a race machined with the highest possible accuracy.

This object is achieved, in accordance with the present invention, by a manufacturing method comprising steps including:

obtaining a steel disc blank of steel with a machining allowance, the disc blank having a first face with a concave race, a second face opposite the first face, a through central bore extending between the first and the second faces, and an outer peripheral edge;

heat treating the disc blank;

turning the concave race on a lathe;

wherein the phase of turning the concave race is preceded by a phase of turning the bore, thereby obtaining at least a turned cylindrical portion of the bore, and the phase of turning the concave race is carried out while the disc blank is locked on the lathe by means of jaws which engage the turned cylindrical portion, using this turned cylindrical portion as a reference surface for turning the concave race.

Preferred embodiments of the invention are defined in the dependent claims.

BRIEF DESCRIPTION OF DRAWINGS

A few preferred, but not limiting embodiments of the invention will now be described, reference being made to the accompanying drawings, in which:

FIGS. 2 and 3 are views similar to FIG. 1, showing two respective disc drives which differ in the shape of the central bore.

DETAILED DESCRIPTION

Figure 1:
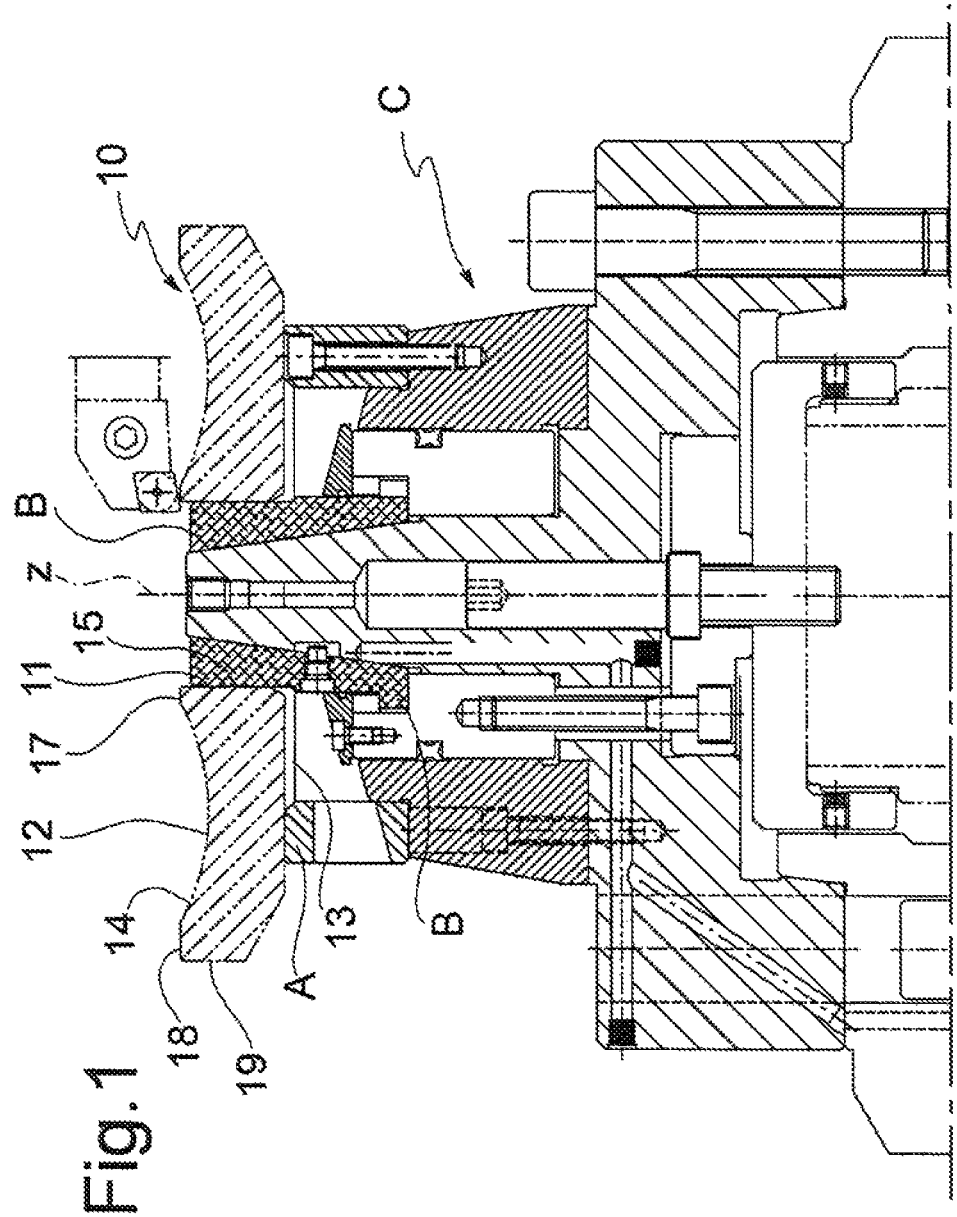
FIG. 1 is a schematic vertical cross-sectional view of a variator disc locked on a lathe during a turning step in a method according to an embodiment of the invention.

Referring initially to FIG. 1, a variator disc 10 for use in a toroidal continuously variable transmission has a central through bore 11, which extends in a direction, herein defined as axial, along an axis z between two opposite faces 12, 13 of the disc. One of the faces, herein referred to as the main face 12, has a concave race 14 to be engaged by a disc-shaped roller (not shown) forming part of a toroidal continuously variable transmission.

The bore 11 serves to mount the disc on a shaft (not shown) adapted to drive the disc for rotation. The bore 11 has at least a cylindrical portion 15, as discussed hereinafter.

Figure 2:
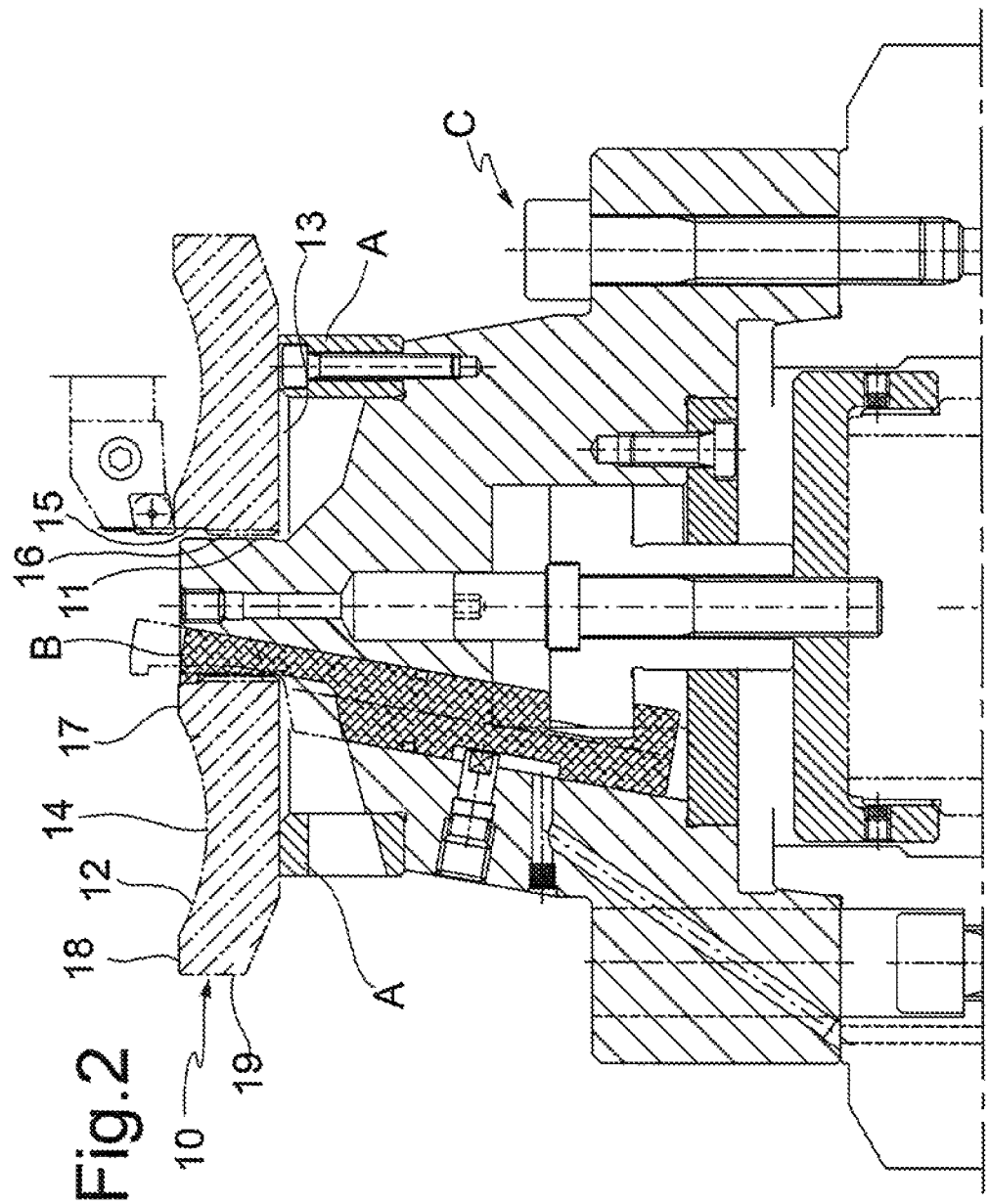

In the embodiment illustrated in FIG. 1, the cylindrical portion 15 extends around the bore 11. If the disc is adapted to be mounted on a splined transmission shaft, a portion 16 of the bore 11 is splined, as shown in the embodiment of FIG. 2. The formation of a splined portion 16 in the bore constitutes a preferred, but certainly not essential, choice for certain implementations of the invention. In particular, the bore may have other configurations suitable to allow the transmission of the motion imparted by the shaft. For example, the bore may provide, in addition to the cylindrical portion 15, a splined or ribbed or polygonal cross-section portion (square, rectangular, hexagonal), or threaded, or, more generally, any non-cylindrical shape and in any case suitable to transmit a rotary motion from the shaft to disc or vice versa.

The main face 12 of the disc has two concentric flat annular surfaces 17, 18, transverse to the axis z, which delimit the concave race 14: a first, radially innermost annular surface 17 extends between the race 14 and the bore 11, and a second, radially outermost annular surface 18 extends between the race 14 and a cylindrical outer peripheral edge 19 of the disc. The surface 18 need not necessarily to be a flat annular surface transverse to the z axis, but may also be a curved surface.

An embodiment of the disc manufacturing method provides a preliminary forging step that provides a disc-shaped steel blank, preferably made of a bearing-grade stainless steel, having the shape of a perforated disc, roughly corresponding to the shape of the finished disc, with a machining allowance (not shown).

The disc blank is preliminarily subjected to a turning step, in which most of the machining allowance is removed, and subsequently to a heat-treatment step in which the metal is hardened. Both heat-treatment and turning are known methods, the description of which is deemed unnecessary here for the purposes of understanding the invention.

Following the turning step, a disc blank 10 is obtained, such as the one illustrated in the accompanying drawings. The disc blank provides the following rough surfaces to be subsequently machined by hard turning: the main face 12 with the concave race 14 and the concentric annular surfaces 17, 18, the rear face 13, the central bore 11 and the outer peripheral edge 19.

After the heat-treatment step, the disc blank is machined on a numerically controlled lathe C, subjecting it to a sequence of hard turning steps. According to a preferred embodiment, the radially innermost annular rough surface 17 is firstly placed on a workpiece holder faceplate A of the lathe, locking the disc 10 on its outer edge 19 by means of jaws (not shown). At first the bore 11 is turned, thus obtaining at least one cylindrical bore portion 15 worked with high accuracy, and the rear face 13 of the disc. The sequential order of turning the surfaces 15 and 13 is not important for the purposes of the invention.

Then the disc 10 is turned upside down, resting the back face 13, just turned, on the faceplate A. The disc 10 is so locked on the lathe by engaging the jaws B of the lathe against the already turned length of the cylindrical bore 15 and, by using this high-precision machined cylindrical surface as the reference surface, the following surfaces are turned: the race 14, the two transversal surfaces 17, 18 of the main face 12 and the outer cylindrical edge 19.

The shape of the jaws B may depend on the geometry of the bore 11, in particular on the diameter and axial extension of the cylindrical portion 15.

Owing to the choice of the cylindrical surface 15 of the bore as a reference surface for machining the race, the latter is defined with extreme accuracy with respect to the bore, without being adversely affected by tolerances with which other surfaces are machined.

It will be appreciated, in particular, that the accuracy with which the concave race is machined is not affected by coupling tolerances between the variator disc and the shaft on which the disc is mounted. Furthermore, the finishing accuracy of the concave race is not affected by tolerances resulting from the choice of the reference surfaces (such as the sides of grooves) that would inevitably cause non-negligible tolerances related to technology with which these surfaces are formed or finished (for example grooves formed by broaching).

In the same step in which the race is machined, or at a later stage, a portion of the bore can be machined so as to form the grooves or other engaging formations for allowing to couple the disc for rotation with the rotary shaft (not shown) on which the disc is then mounted. Advantageously, the machining of grooves or other formations for the transmission of the rotary motion is carried out while locking the disc in the cylindrical length of the bore. In this way both the race and the grooves (or other formations) have a geometry precisely referred to the same reference surface, represented by the cylindrical surface of the bore.

The mode of forming the grooves or other conformations for the transmission of the rotary motion is optional. In one embodiment, the grooves may be formed by internal broaching, for example by using a broach on the blank before the hardening heat-treatment, and then a second finishing step of the grooves may be performed after the turning of the cylindrical portion 15 of the bore, using the cylindrical portion as a reference surface. In one embodiment, the grooves are finished through a wire EDM step.

It is intended that the invention is not limited to the embodiments described and illustrated herein, which are to be considered as examples of the method. For example, the invention is susceptible of modifications concerning the sequence of some of the working steps of the various surfaces of the variator disc. Similarly, the shape and arrangement of the surfaces in the non-cylindrical length 16 of the bore, intended to transfer the rotation from the shaft to the disc, may vary according to specific requirements. FIG. 3 shows, by way of example, an embodiment in which, differently from FIG. 2, the section of the splined or non-cylindrical bore 16 is located closer to the face 13 than to the face 12 which provides the concave race 14.

What is claimed is:

1. A method for manufacturing a variator disc for use in a toroidal continuously variable transmission, the method comprising steps of:
   obtaining a steel disc blank of steel with a machining allowance, the disc blank having a first face with a concave race, a second face opposite the first face, a through central bore extending between the first and the second faces, and an outer peripheral edge;
   heat treating the disc blank;
   turning the concave race on a lathe;
   wherein the phase of turning the concave race is preceded by a phase of turning the bore, thereby obtaining at least a turned cylindrical portion of the bore, and
   the phase of turning the concave race is carried out while the disc blank is locked on the lathe by jaws which engage the turned cylindrical portion, using the turned cylindrical portion as a reference surface for turning the concave race.

2. A method according to claim 1, wherein the phase of turning the turned cylindrical portion is preceded by steps of:
   resting a surface of the first face of the disc blank on a faceplate of the lathe; and
   locking the disc blank on the faceplate by the jaws which grip the outer peripheral edge, so as to carry out the turning of the turned cylindrical portion with the disc blank locked in this position.

3. A method according to claim 1, the method further comprising a step of turning the second face of the disc while the disc blank is locked on the faceplate in the position in which the turning of the turned cylindrical portion is performed.

4. A method according to claim 3, wherein, upon completion of the phases of turning the cylindrical portion and the second face, the following steps are carried out:
   the disc blank is turned upside down;
   then the second, turned face of the disc is placed on the faceplate; and
   then the disc blank is locked on the lathe by engaging the jaws of the lathe against the turned cylindrical portion, for performing said step of turning of the concave race.

5. A method according to claim 1, the method further comprising steps of turning the following surfaces:
   a first, radially innermost annular surface, which extends across the first face between the concave race and the bore;
   a second, radially outermost annular surface, concentric with the first annular surface, the second annular surface extending across the first face between the concave race and the peripheral outer edge; and
   a surface of the outer peripheral edge;
   while the disc blank is locked on the lathe the jaws engaged on the turned cylindrical portion for the phase of turning the concave race.

6. A method according to claim 1, the method further comprising, after the step of turning of the turned cylindrical portion, a step of machining a further section of the bore, different from the turned cylindrical portion, so as to form in this further section a plurality of at least one of:

splines, and
other engaging formations,
   wherein the at least one of splines and other engaging formations are suitable to allow rotational coupling of the disc with a rotating shaft to be inserted into the bore.

7. A method according to claim 6, wherein the phase of machining the further portion of the bore is carried out while the disc is locked on the lathe by the jaws which engage the turned cylindrical portion for the phase of turning the concave race.

* * * * *